(12) United States Patent
Saito et al.

(10) Patent No.: US 6,769,817 B2
(45) Date of Patent: Aug. 3, 2004

(54) OPTICAL FIBER MODULE

(75) Inventors: Tsunetoshi Saito, Tokyo (JP); Junichi Hasegawa, Tokyo (JP); Kanji Tanaka, Tokyo (JP); Kazuhisa Kashihara, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 70 days.

(21) Appl. No.: 10/260,493

(22) Filed: Oct. 1, 2002

(65) Prior Publication Data

US 2003/0103738 A1 Jun. 5, 2003

(30) Foreign Application Priority Data

Oct. 2, 2001 (JP) ...................................... 2001-306524

(51) Int. Cl.[7] ................................................ G02B 6/36
(52) U.S. Cl. ............................ 385/90; 385/88; 385/89; 385/91
(58) Field of Search ............................. 385/88, 89, 90, 385/91, 92, 93, 94

(56) References Cited

U.S. PATENT DOCUMENTS 5,095,517 A * 3/1992 Monguzzi et al. ............ 385/90
5,337,392 A * 8/1994 Mousseaux et al. .......... 385/90
6,074,103 A * 6/2000 Hargreaves et al. .......... 385/90
6,164,837 A * 12/2000 Haake et al. ................. 385/90
6,247,852 B1 * 6/2001 Joyce .......................... 385/90

FOREIGN PATENT DOCUMENTS

| JP | 7-13039 | 1/1995 |
| JP | 7-92342 | 4/1995 |
| JP | 8-94875 | 4/1996 |
| JP | 8-171029 | 7/1996 |

* cited by examiner

*Primary Examiner*—Phan T. H. Palmer
*Assistant Examiner*—Jennifer Doan
(74) *Attorney, Agent, or Firm*—Oblon, Spivak, McClelland, Maier & Neustadt, P.C.

(57) ABSTRACT

An optical fiber module is formed by storing an optical component and a connection portion of this optical component and an optical fiber into a package. The optical fiber module has the package, the optical component unfixedly stored into the package, and the optical fiber in which one end side of the optical fiber is connected to the optical component and the other end side is pulled out of the package to the package exterior. An optical fiber anchor member is arranged in the package in an extraction preventing state in an optical fiber pulling-out area of the package. The optical fiber is fixed to the optical fiber anchor member. The optical fiber anchor member and the package are set to be relatively moved in the optical fiber longitudinal direction.

19 Claims, 11 Drawing Sheets

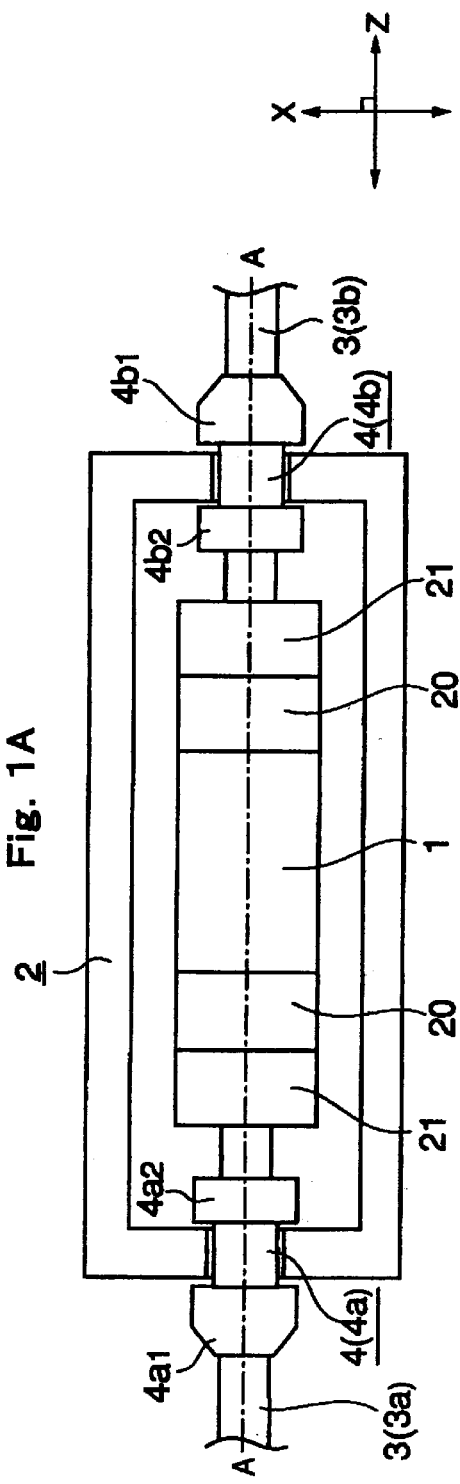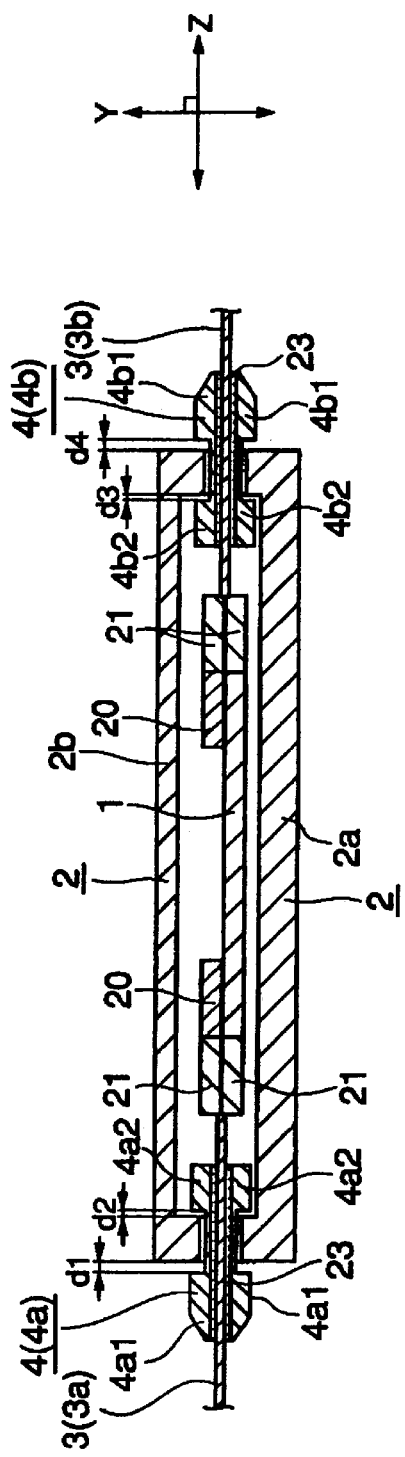

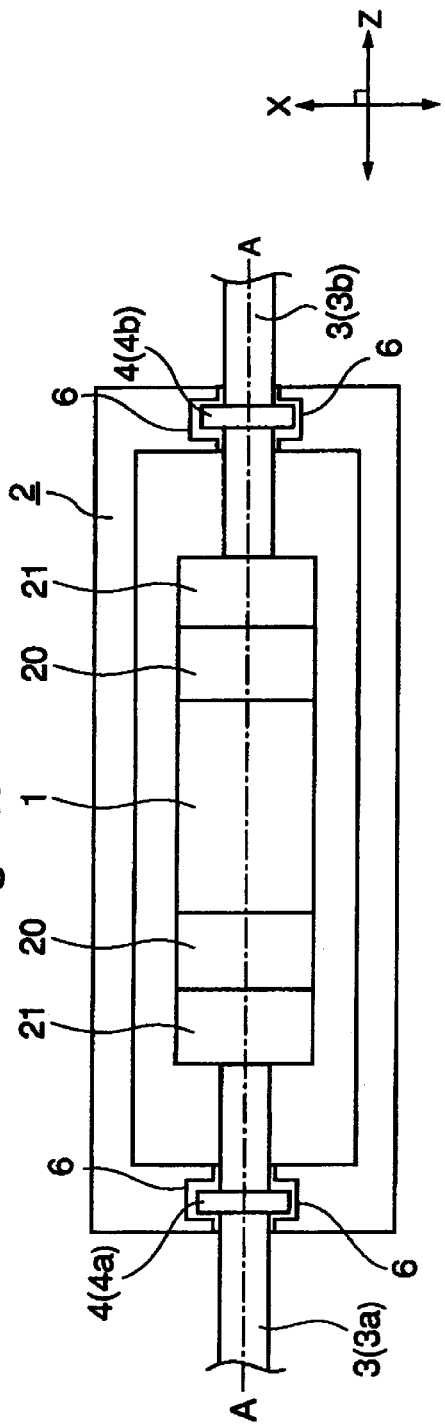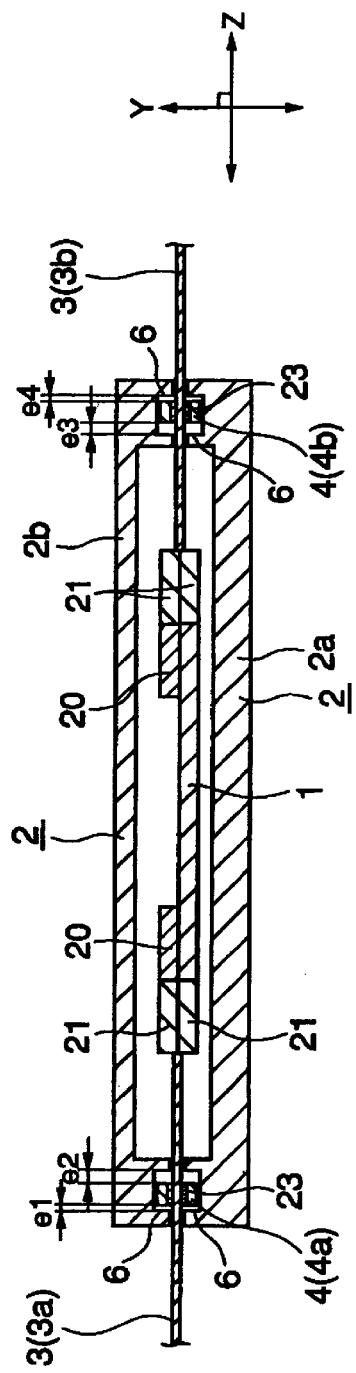

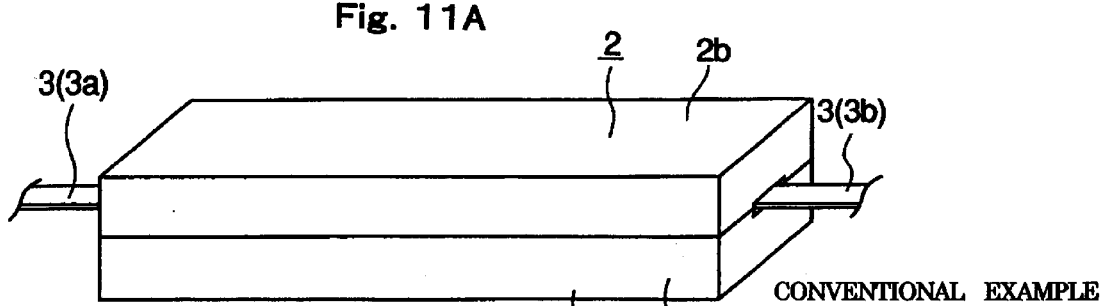
Fig. 11A  CONVENTIONAL EXAMPLE
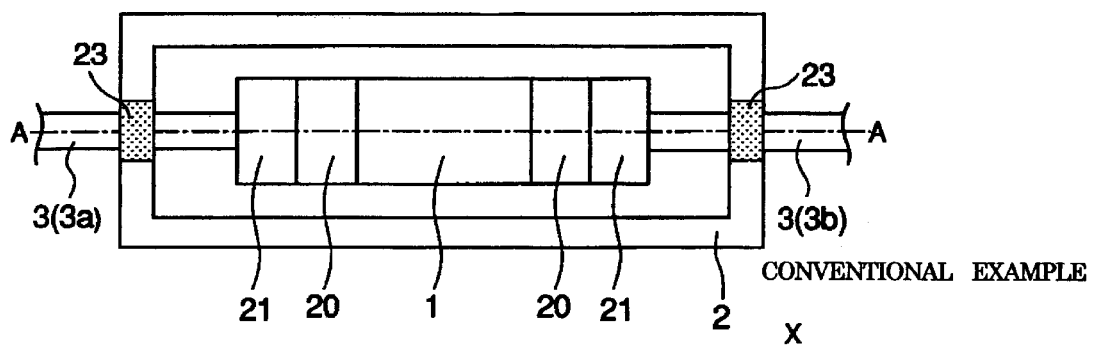
Fig. 11B  CONVENTIONAL EXAMPLE
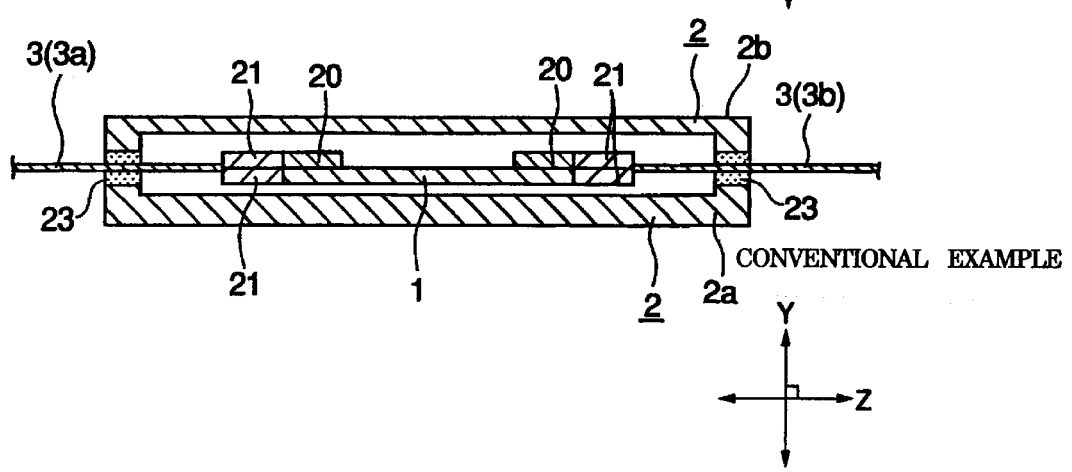
Fig. 11C  CONVENTIONAL EXAMPLE dimension# OPTICAL FIBER MODULE

BACKGROUND OF THE INVENTION

Optical components having the functions of optical branching, an optical switching, wavelength multiplexing and demultiplexing, etc. are widely used in optical communication. The optical components are variously formed, but wide utilization in the future is expected from an integration property and mass productivity with respect to an optical component having an optical waveguide circuit in which the circuit of an optical waveguide is formed on a substrate among these optical components. The optical waveguide circuit was conventionally formed by arranging the circuit of the optical waveguide constructed by the material of a silica-base, etc. on the substrate of silicon, silica, etc. However, the optical waveguide circuit using the material of a polyimide-base in forming areas of the substrate and the optical waveguide is also recently formed.

SUMMARY OF THE INVENTION

The present invention provides an optical fiber module having various kinds of optical components as mentioned above. The optical fiber module in one aspect of the present invention comprises:

a package;

an optical component unfixedly stored into the package; and at least one optical fiber in which one end side of the optical fiber is connected to the optical component and the other end side is inserted into the package in a non-fixing state and is pulled out to the package exterior;

wherein an optical fiber anchor member is arranged in the package in an extraction preventing state in an optical fiber pulling-out area of the package;

the optical fiber anchor member and the optical fiber are fixed; and a relative movement range able to relatively move the optical fiber anchor member and the package in the optical fiber longitudinal direction is given between the optical fiber anchor member and the package.

Further, the optical fiber module in another aspect of the present invention comprises:

a package;

an optical component unfixedly stored into the package;

at least one first optical fiber in which one end side of the fiber is connected to one end side of the optical component, and the other end side of the fiber is inserted into one end side of the package in a non-fixing state and is pulled out to the package exterior; and at least one second optical fiber in which one end side of this fiber is connected to the other end side of the optical component, and the other end side of this fiber is inserted into the other end side of the package in the non-fixing state and is pulled out to the package exterior;

wherein a first optical fiber anchor member is arranged in the package in an extraction preventing state in an optical fiber pulling-out area on one end side of the package;

a second optical fiber anchor member is arranged in the package in the extraction preventing state in the optical fiber pulling-out area on the other end side of the package;

the first optical fiber anchor member and the first optical fiber are fixed, and the second optical fiber anchor member and the second optical fiber are fixed; and a relative movement range able to relatively move the first and second optical fiber anchor members and the package in the optical fiber longitudinal direction is given between the first and second optical fiber anchor members and the package.

The optical fiber module in still another aspect of the present invention comprises:

a package;

an optical component unfixedly stored into the package;

at least one first optical fiber in which one end side of the fiber is connected to one end side of the optical component, and the other end side of the fiber is inserted into one end side of the package in a non-fixing state and is pulled out to the package exterior; and at least one second optical fiber in which one end side of this fiber is connected to the other end side of said optical component, and the other end side of this fiber is inserted into the other end side of the package in the non-fixing state and is pulled out to the package exterior;

wherein a first optical fiber anchor member is fixedly arranged in the first optical fiber in an extraction preventing state with respect to the package in an optical fiber pulling-out area on one end side of the package;

a second optical fiber anchor member is fixedly arranged in the second optical fiber in the extraction preventing state with respect to the package in the optical fiber pulling-out area on the other end side of the package;

each of the first and second optical fiber anchor members has first and second flange portions projected in a direction crossing the optical fiber longitudinal direction in positions spaced from each other in the optical fiber longitudinal direction;

the wall of the optical fiber pulling-out area of the package is nipped by these first and second flange portions from both sides through intervals;

the first flange portion is arranged in the package exterior and the second flange portion is arranged in the package interior; and $d1>d3$ and $d4>d2$ are formed when the interval between the first flange portion of the first optical fiber anchor member and the package is set to $d1$, and the interval between the second flange portion of the first optical fiber anchor member and the package is set to $d2$, and the interval between the second flange portion of the second optical fiber anchor member and the package is set to $d3$, and the interval between the first flange portion of the second optical fiber anchor member and the package is set to $d4$.

BRIEF DESCRIPTION OF THE DRAWINGS

Exemplary embodiments of the invention will now be described with reference to drawings in which:

FIGS. 1A and 1B are constructional explanatory views showing one embodiment of an optical fiber module in the present invention.

FIGS. 7A and 7B are constructional explanatory views showing further another embodiment of the optical fiber module in the present invention.

FIGS. 11A, 11B and 11C are explanatory views showing a constructional example of a conventional optical fiber module.

DETAILED DESCRIPTION

Figure 8:
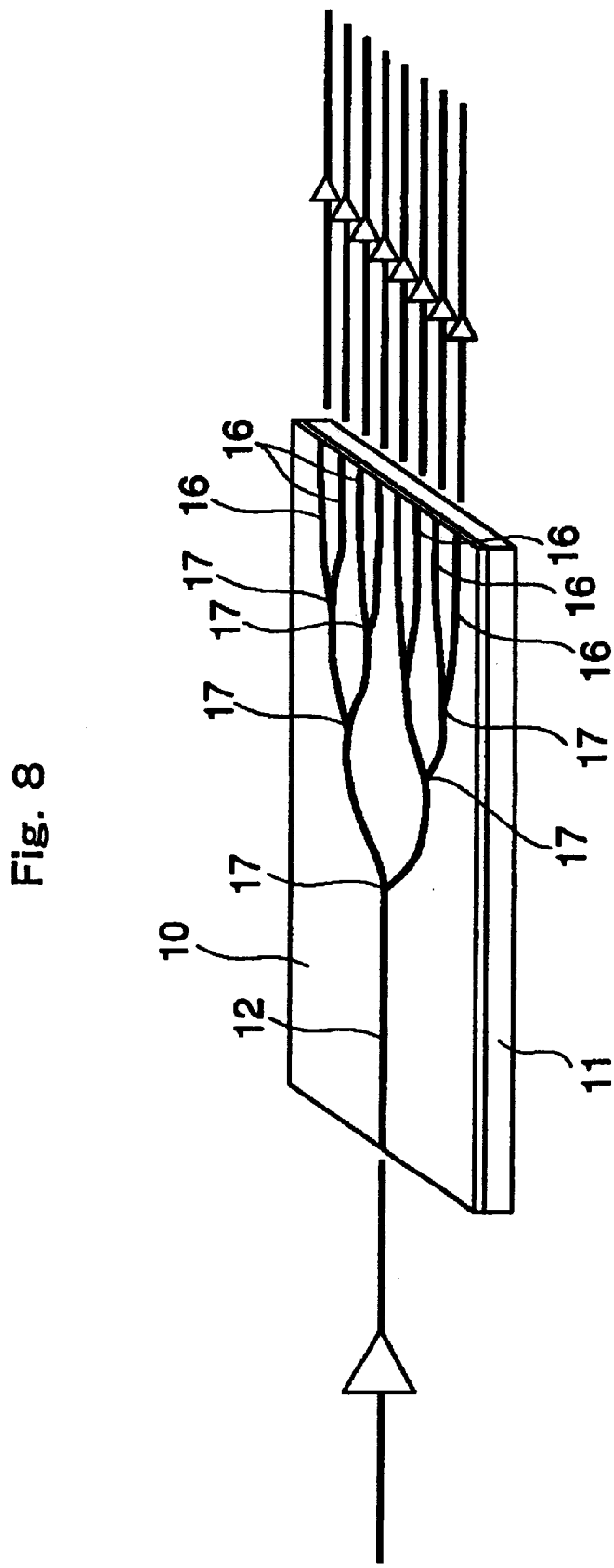
FIG. 8 is an explanatory view showing an example of an optical waveguide circuit having a 1×8 optical waveguide circuit.
Figure 9:
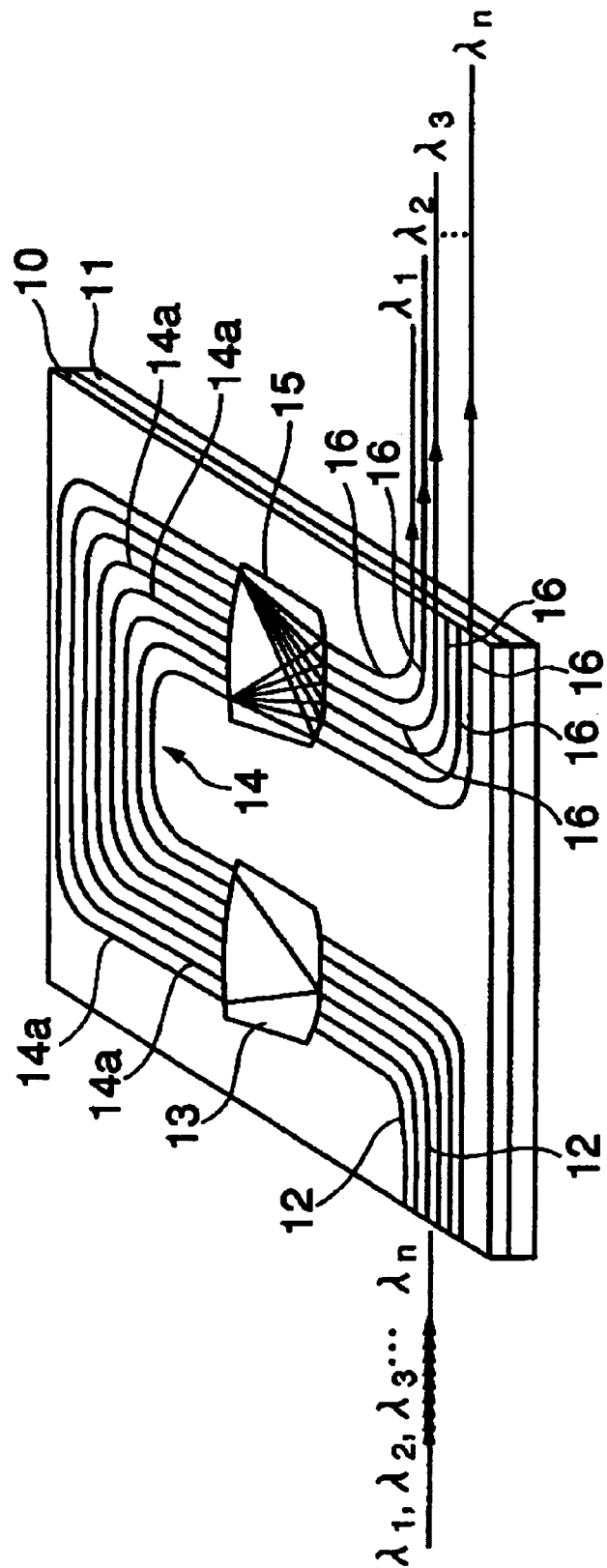
FIG. 9 is an explanatory view showing an example of the optical waveguide circuit having the circuit of an arrayed waveguide grating.
Figure 10:
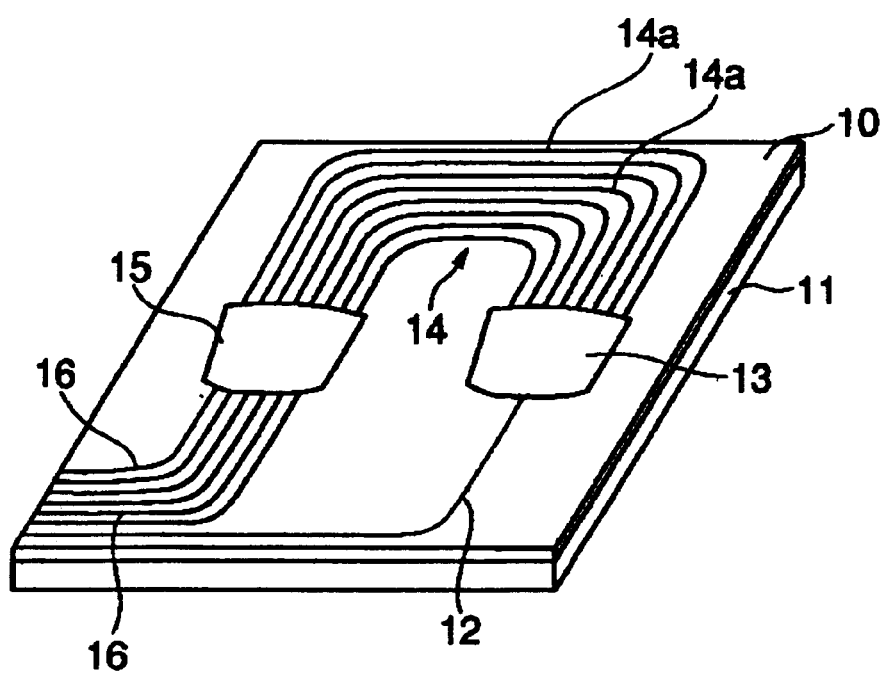
FIG. 10 is an explanatory view showing another example of the optical waveguide circuit having the circuit of the arrayed waveguide grating.

FIGS. 8 to 10 are respectively views showing examples of optical waveguide circuits. In each of these optical waveguide circuits, a waveguide forming area 10 is formed on a substrate 11. FIG. 8 shows a constructional example of the optical waveguide circuit in which a 1×8 optical branching waveguide circuit is formed in the waveguide forming area 10. FIGS. 9 and 10 show constructional examples of the optical waveguide circuit in which the circuit of an arrayed waveguide grating is formed as the circuit of the optical waveguide. The arrayed waveguide grating is used for wavelength division multiplexing, and its circuit construction is variously proposed.

As shown in FIG. 8, the 1×8 optical branching waveguide circuit has one optical input waveguide 12 and eight optical output waveguides 16. Plural branching portions 17 are arranged between the optical input waveguide 12 and the optical output waveguide 16.

As shown in FIGS. 9 and 10, the circuit of the arrayed waveguide grating has one or more optical input waveguides 12, a first slab waveguide 13 connected to the output end of the optical input waveguide 12, an arrayed waveguide 14 connected to the output end of the first slab waveguide 13, a second slab waveguide 15 connected to the output end of the arrayed waveguide 14, and plural optical output waveguides 16 connected to the output end of the second slab waveguide 15 and arranged side by side.

The above arrayed waveguide 14 propagates light guided from the first slab waveguide 13, and is formed by arranging plural channel waveguides 14a side by side. The lengths of adjacent channel waveguides 14a are different from each other by a set amount (ΔL).

For example, the optical output waveguide 16 is arranged in accordance with the number of signal lights demultiplexed or multiplexed by the arrayed waveguide grating and having wavelengths different from each other. Many channel waveguides 14a, e.g., 100 channel waveguides 14a constituting the arrayed waveguide 14 are normally arranged. However, in FIGS. 9 and 10, the respective numbers of these channel waveguides 14a, optical output waveguides 16 and optical input waveguides 12 are schematically shown to simplify these figures.

In the circuit of the arrayed waveguide grating, for example, as shown in FIG. 9, when wavelength-multiplexed light is introduced into the optical input waveguide 12, this wavelength-multiplexed light is introduced into the first slab waveguide 13 through the optical input waveguide 12. The light widened by its diffraction effect is incident to the arrayed waveguide 14, and is propagated in the arrayed waveguide 14.

The light propagated in this arrayed waveguide 14 reaches the second slab waveguide 15, and is converged and outputted to the optical output waveguide 16. Since the lengths of all the channel waveguides 14a of the arrayed waveguide 14 are different from each other, a shift is caused in the phase of the individual light after this light is propagated in the arrayed waveguide 14. The phasefront of the converged light is inclined in accordance with this phase shifting amount, and a convergent position is determined by this inclination angle. Accordingly, the lights of different wavelengths can be respectively outputted from the different optical output waveguides 16 by arranging the optical output waveguide 16 in each convergent position.

FIG. 10 shows a construction in which the input end of one optical input waveguide 12 and the output ends of plural optical output waveguides 16 are arranged on one end face (the same side end face) of a chip of the optical waveguide circuit in the circuit of the arrayed waveguide grating.

For example, as shown in FIGS. 11A to 11C, an optical component 1 having the optical waveguide circuit having the circuit of the above arrayed waveguide grating or an optical branching waveguide circuit is stored into a package 2, and is used as an optical fiber module. FIG. 11A is a perspective view of the optical fiber module. FIG. 11B is a view of the optical fiber module seen from its upper portion by looking-through its interior. FIG. 11C is an A—A cross-section of FIG. 11B.

The optical fiber module shown in FIGS. 11A to 11C has a first optical fiber 3 (3a) connected to one end side of the optical component 1, and a second optical fiber 3 (3b) connected to the other end side of the optical component 1. One end side of each of these optical fibers 3 (3a, 3b) is connected to the optical component 1, and the other end side is pulled out from the package 2 to the package exterior.

For example, each of the first and second optical fibers 3a, 3b are formed by an optical fiber ribbon constructed by arranging plural optical fibers side by side. An optical fiber array 21 is arranged on a connecting end face of the optical fiber ribbon. The connection of the first and second optical fibers 3a, 3b and the optical component 1, i.e., the connection of the optical fiber array 21 and the optical component 1 is made by fixation using an adhesive 23. A chip upper plate 20 is stuck to a connecting end face of the optical component 1 to more stably connect the optical component 1 and the first and second optical fibers 3a, 3b.

The package 2 has a package main body 2a and a cover portion 2b. The package 2 is mainly formed by a metal such as aluminum, stainless steel, or plastic. The optical component 1 and the connection portion of the optical component 1 and the optical fibers (3a, 3b) are stored into the package 2 so as to protect these.

It is generally required in the optical fiber module that optical characteristics such as insertion loss are not changed even when the optical fibers 3 (3a, 3b) is pulled from the exterior. Therefore, the optical fiber module is constructed such that the optical fibers 3 (3a, 3b) is fixed and anchored to the package 2 by the adhesive 23, etc. so as not to transmit tensile stress applied to the optical fibers 3 (3a, 3b) to the internal optical component 1.

Further, there is a case in which unillustrated boots mainly manufactured by rubber are attached to the vicinity of a pulling-out portion of the optical fibers 3 (3a, 3b) pulled out of the package 2 to restrain that the transmission loss, etc. of the optical fiber module are increased by bending stress applied to the optical fibers 3 (3a, 3b).

Further, in FIG. 11C, the optical component 1 is not fixed into the package 2, but is drawn so as to be floated. However, there is also a case in which the optical component 1 is fixed to the package 2, or comes in direct contact with the package 2, or another member and a buffer material such as a sponge are interposed between the optical component 1 and the package 2.

In general, for example, the optical fiber module is used in the temperature range of 0° C. to 70° C. as a premise. It is required in the optical fiber module that no characteristics of the optical fiber module are changed within this range of temperature for use. For example, it has required that no characteristics are deteriorated even when the optical fiber module is exposed to a temperature of −40° C. to 85° C.

However, the package 2 of the optical fiber module is formed by a material such as a metal, plastic, having a large linear expansion coefficient. Therefore, the package 2 is greatly expanded and contracted by the temperature change in comparison with a constructional member of the optical component 1 and the optical fibers 3 (3a, 3b).

Therefore, when the above temperature change is caused, stress is applied to a portion of the optical fibers 3 (3a, 3b) within the package 2 fixed by the package 2 and the adhesive 23, and is also applied to the optical component 1 adhered and fixed to the optical fibers 3 (3a, 3b). Therefore, a problem existed in that the insertion loss of the connection portion of the optical component 1 and the optical fibers 3 (3a, 3b) was particularly increased.

Further, there was a case in which the connection portion of the optical component 1 and the optical fibers 3 (3a, 3b) was broken by the above stress application, and a performance reduction of the optical fiber module and shortening of its life were caused by the repetitious temperature change even when no connection portion was broken.

The above problems can be solved to a certain extent by forming the package 2 by e.g. a glass material such as silica, pilex (registered trademark), a material such as Kovar, having a linear expansion coefficient approximately equal to that of each of the optical component 1 and the optical fibers 3 (3a, 3b). However, a problem exists in that it is generally difficult to process these materials, and these materials are fragile and are not suitable as the material of the package 2, or are very expensive.

Further, a problem existed in that a work for fixing the optical fibers 3 (3a, 3b) to the package 2 was very difficult and no manufacture yield was good as a separate problem of the conventional optical fiber module.

This is because it is necessary to manufacture the conventional optical fiber module by fixing the optical fibers 3 (3a, 3b) to the package 2 in a state in which no stress is applied to the optical component 1 and the connection portion of the optical component 1 and the optical fibers 3 (3a, 3b), and very large attention and technique are required in this fixing manufacture work.

In the conventional optical fiber module, the characteristics are deteriorated when the optical component 1 and the optical fibers 3 (3a, 3b) are not fixed to the package 2 in a state in which the optical component 1 and the optical fibers 3 (3a, 3b) are arranged in accurate positions. Therefore, it is difficult to improve the yield of the manufacture.

Therefore, it is considered that the above stress is absorbed by loosening the optical fibers 3 (3a, 3b) from the fixing portion of the optical fibers 3 (3a, 3b) and the package 2 to the optical component 1, and curving the optical fibers 3 (3a, 3b).

However, it is necessary to make an excessive length portion of the optical fibers 3 (3a, 3b) within the package 2 so as to absorb the above stress. It is also necessary to lengthen the optical fibers 3 (3a, 3b) by the loosening amount of its length stored into the package 2. Therefore, the problem that the optical fiber module is large-sized, is caused.

Further, there is also a method for relaxing the above stress applied to the optical component 1 and the connection portion of the optical component 1 and the optical fibers 3 (3a, 3b) by setting the adhesive 23 for fixing the optical fibers 3 (3a, 3b) to the package 2 to a soft adhesive having elasticity to a certain extent.

However, when this method is applied, the stress applied from the exterior of the package 2 to the optical fibers 3 (3a, 3b) is transmitted to the optical component 1. Therefore, the problem that the characteristics of the optical component 1 are changed, and an excessive load is applied to the connection portion of the optical component 1 and the optical fibers 3 (3a, 3b) and the connection portion is broken, is caused by this stress.

Japanese Laid-Open Patent No. JP8-171029 proposes a construction in which the adhesive 23 for fixing the optical fibers 3 to the package 2 in a pulling-out portion of the optical fibers 3 from the package 2 is set to a soft adhesive having elasticity to a certain extent in the optical fiber module in which the optical component 1 and the connection portion of the optical component 1 and the optical fibers 3 are stored to the package 2.

In this proposal, tensile stress or bending stress applied to the optical fibers 3 by expanding and contracting the package 2 is restrained by unfixing the optical fibers 3 to the package 2, or fixing the optical fibers 3 by a very soft adhesive so as to avoid that the stress is applied to the connection portion of the optical fibers 3 and the optical component 1.

However, in this proposal, even when it is avoided that the stress is applied to the optical fibers 3 by a temperature change, the stress is directly transmitted to the connection portion of the optical fibers 3 and the optical component 1 when the tensile stress or the bending stress is applied to the optical fibers 3 by another factor. Therefore, breakdown of the optical fiber module is caused and no basic characteristics originally required in the package 2 can be satisfied.

The present invention provides a simple cheap compact optical fiber module in which no optical fiber module is limited to the package material and no characteristic deterioration, etc. are easily caused by the influence of thermal expansion and contraction of the package due to the tensile stress from the package exterior to the optical fiber and the use temperature change in one example.

Various kinds of embodiments of the present invention will next be explained, but the same term portions are designated by the same reference numerals, and their overlapping explanations are omitted or simplified.

FIGS. 1A and 1B show the construction of one embodiment of the optical fiber module in the present invention. FIG. 1A is a view in which the interior of the optical fiber module of this embodiment is looked through and is seen from its upper portion. FIG. 1B is a cross-section along a chain line A—A of FIG. 1A.

As shown in these FIGS. 1A and 1B, the optical fiber module of this embodiment has a package 2, an optical component 1 unfixedly stored into the package 2, and an optical fibers 3 (3a, 3b). One end side of the optical fibers 3 (3a, 3b) is connected to the optical component 1, and the other end side is pulled-out from the above package 2 to the package exterior. For example, the optical component 1 is an optical waveguide circuit forming a 1×8 optical branching waveguide circuit shown in FIG. 8.

A first optical fiber 3a is connected to one end side of the optical component 1, and a second optical fiber 3b is connected to the other end side of the optical component 1. The first optical fiber 3a is pulled out of one end side of the package 2 in a non-fixing state with respect to the package 2. The second optical fiber 3b is pulled out of the other end side of the package 2 in the non-fixing state with respect to the package 2. Each of the first and second optical fibers 3 (3a, 3b) is an optical fiber ribbon constructed by arranging eight optical fiber core wires side by side.

In an optical fiber pulling-out area of the package 2, optical fiber anchor members 4 (4a, 4b) is arranged in the package 2 in an extraction preventing state. The optical fiber anchor members 4 (4a, 4b) is formed by baiton (rubber). There is a slight interval (gap) between the optical fiber anchor members 4 (4a, 4b) and the package 2 in each of the X-direction and the Y-direction.

Each optical fiber 3 (3a, 3b) is inserted into the optical fiber anchor members 4 (4a, 4b). In this insertion portion, the optical fibers 3 (3a, 3b) and the optical fiber anchor members 4 (4a, 4b) are fixed by an adhesive 23. The adhesive 23 is approximately arranged in the entire area of the optical fiber anchor members 4 (4a, 4b) in its longitudinal direction. The first optical fiber 3a and the first optical fiber anchor member 4a are fixed, and the second optical fiber 3b and the second optical fiber anchor member 4b are fixed.

The first optical fiber anchor member 4 (4a) and the second optical fiber anchor member 4 (4b) respectively have first flange portions 4a1, 4b1 and second flange portions 4a2, 4b2 projected in the direction crossing the optical fiber longitudinal direction in positions spaced from each other in the optical fiber longitudinal direction (the Z-direction in FIGS. 1A and 1B). These first flange portions 4a1, 4b1 and these second flange portions 4a2, 4b2 nip the wall of the optical fiber pulling-out area of the package 2 from both sides through intervals.

In this embodiment, the optical fiber anchor members 4 (4a, 4b) and the package 2 can be relatively moved in the optical fiber longitudinal direction, and the optical fiber anchor members 4 (4a, 4b) is arranged in the package 2 in the extraction preventing state as mentioned above.

The first flange portions 4a1, 4b1 are arranged in the exterior of the package 2, and the second flange portions 4a2, 4b2 are arranged in the interior of the package 2. The interval between the first flange portion 4a1 of the first optical fiber anchor member 4a and the package 2 is set to d1. The interval between the second flange portion 4a2 of the first optical fiber anchor member 4a and the package 2 is set to d2. The interval between the second flange portion 4b2 of the second optical fiber anchor member 4b and the package 2 is set to d3. The interval between the first flange portion 4b1 of the second optical fiber anchor member 4b and the package 2 is set to d4.

The values of the above intervals d1, d2, d3, d4 are variables, and d1>d3 and d4>d2 are formed in the relation of these intervals.

In this embodiment, the relative movement range of the optical fiber anchor members 4 (4a, 4b) and the package 2 is formed by d1, d2, d3 and d4 by forming the interval between the optical fiber anchor members 4 (4a, 4b) and the package 2 as mentioned above.

In the following description, the position relation of the optical fiber anchor members 4 (4a, 4b) and the package 2 before tensile stress is applied to the optical fibers 3 (3a, 3b), and the position relation of the optical fiber anchor members 4 (4a, 4b) and the package 2 when the tensile stress is applied to the optical fibers 3 (3a, 3b), will be explained.

Figure 2A:
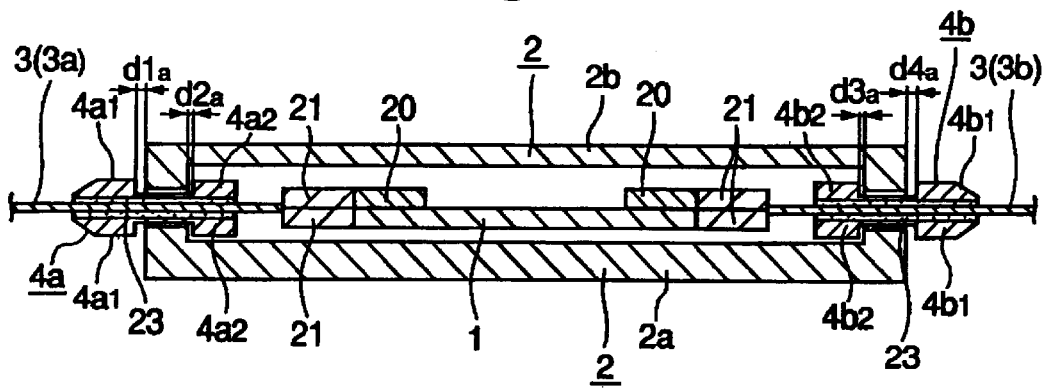
FIGS. 2A, 2B and 2C are explanatory views showing states before and after tensile stress is applied to an optical fiber in the optical fiber module of the above embodiment.

FIG. 2A shows a state (initial state) before the tensile stress is applied to the optical fibers 3 (3a, 3b). As shown in FIG. 2A, the initial values of the above intervals d1, d2, d3, d4 are set to $d1_a$, $d2_a$, $d3_a$, $d4_a$. In the relation of these values $d1_a$, $d2_a$, $d3_a$, $d4_a$, $d1_a > d3_a$ and $d4_a > d2_a$ are set.

Figure 2B:
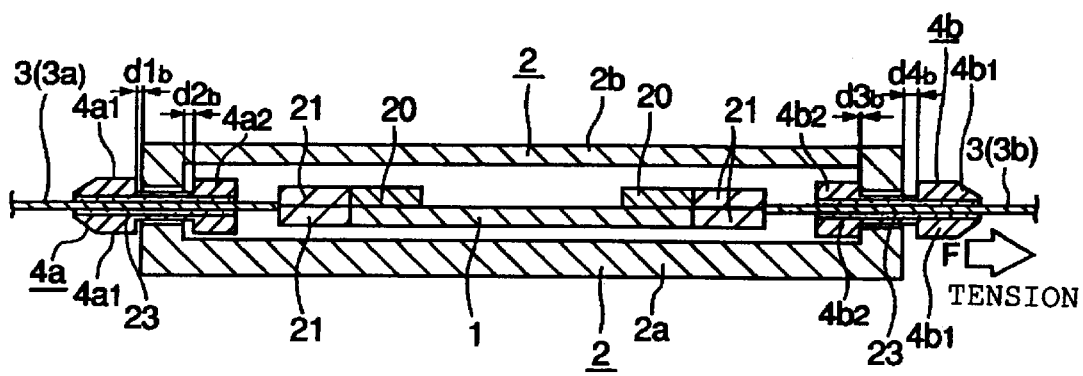

FIG. 2B shows a state when the tensile stress F is applied to the second optical fiber 3 (3b) arranged on the right-hand side of the optical fiber module. When the tensile stress is applied to the second optical fiber 3 (3b), the optical fibers 3 (3a, 3b) and the optical component 1 are relatively moved on the right-hand side of FIG. 2B with respect to the package 2.

In accordance with this movement, the values of the respective intervals d1, d2, d3, d4 are changed, and $d1_a$, $d2_a$, $d3_a$, $d4_a$ are changed to $d1_b$, $d2_b$, $d3_b$, $d4_b$, but $d1_b > d3_b$ and $d4_b > d2_b$ are formed.

When the interval between the second flange portion 4b2 of the second optical fiber anchor member 4 (4b) and the wall of the package 2 is changed to $d3_b$ ($d3_b = 0$), the second optical fiber anchor member 4 (4b) is engaged with the package 2 and cannot be moved any more.

Therefore, even when the second optical fiber 3 (3b) is pulled on the right-hand side of FIG. 2B any more, its tensile force is received by the second flange portion 4b2 so that no optical component 1 can be moved. At this time, since $d1_b > 0$ is formed, it is restrained that the stress is applied to the optical component 1 and the connection portion of the optical component 1 and the optical fibers 3 (3a, 3b). Accordingly, no optical characteristics of the optical component 1 are changed.

Figure 2C:
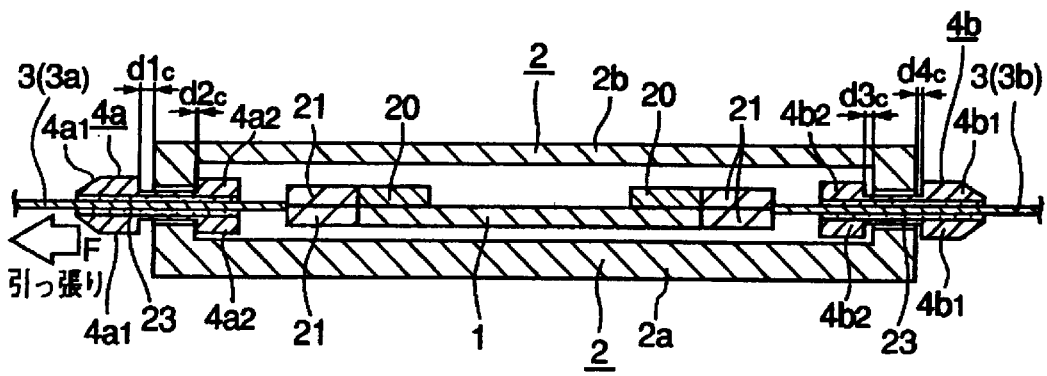

On the other hand, as shown in FIG. 2C, when the tensile stress F is applied to the second optical fiber 3 (3b) arranged on the left-hand side of the optical fiber module, the optical fibers 3 (3a, 3b) and the optical component 1 are relatively moved on the left-hand side of FIG. 2B with respect to the package 2 in accordance with this tensile stress. In accordance with this movement, the values of the respective intervals d1, d2, d3, d4 are changed to $d1_c$, $d2_c$, $d3_c$, $d4_c$, but $d1_c > d3_c$, and $d4_c > d2_c$ are formed.

When the interval between the second flange portion 4a2 of the first optical fiber anchor member 4 (4a) and the wall of the package 2 is changed to $d2_c$ ($d2_c = 0$), the first optical fiber anchor member 4 (4a) is engaged with the package 2 and cannot be moved any more.

Therefore, even when the first optical fiber 3 (3a) is pulled on the left-hand side of FIG. 2C any more, its tensile force is received by the second flange portion 4a2 so that no optical component 1 can be moved. At this time, since $d4_c > 0$ is formed, it is restrained that the stress is applied to the optical component 1 and the connection portion of the optical component 1 and the optical fibers 3 (3a, 3b). Accordingly, no optical characteristics of the optical component 1 are changed.

In this embodiment, the relative movement range of the optical fiber anchor members 4 (4a, 4b) and the package 2 is set to be larger than a relative displacement amount of the package 2 and the optical fiber anchor members 4 (4a, 4b) due to the thermal expansion and contraction of the package 2 caused by the temperature change within the range of temperature for use.

Figure 3A:
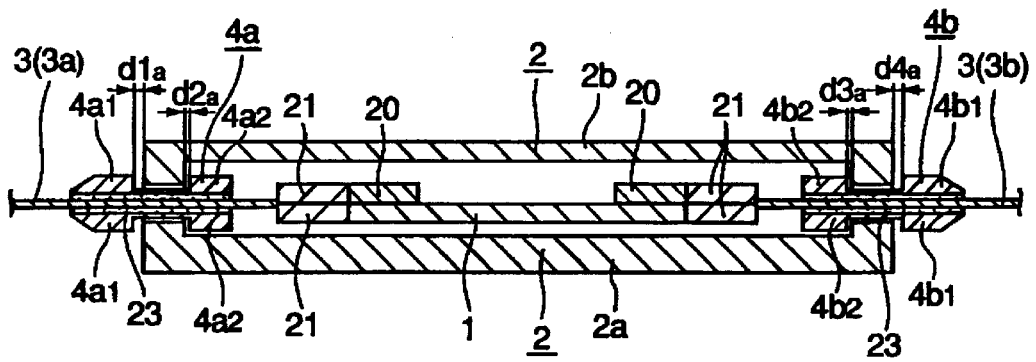
FIGS. 3A, 3B and 3C are explanatory views showing the relative position relation of a package according to a using temperature and an optical fiber anchor member in the optical fiber module of the above embodiment.

FIG. 3A shows the state of the optical fiber module at 20° C. When the values (initial values) of the intervals d1, d2, d3, d4 in this state are set to $d1_a$, $d2_a$, $d3_a$, $d4_a$, the intervals $d1_a$, $d2_a$, $d3_a$, $d4_a$ are positive values. Therefore, no stress is applied to the optical component 1 and the connection portion of the optical component 1 and the optical fibers 3 (3a, 3b).

Figure 3B:
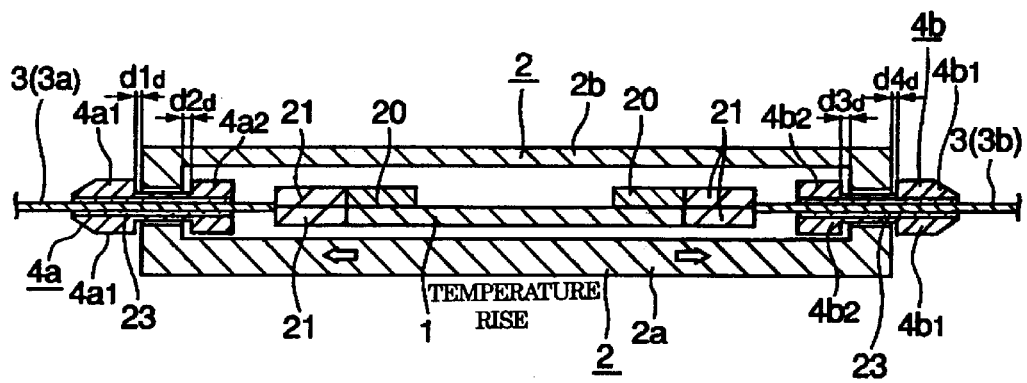

FIG. 3B shows the state of the optical fiber module at 85° C. As temperature rises, the package 2 is expanded and the values of intervals d1 and d4 are reduced. However, since $d1_d > 0$ and $d4_d > 0$ are formed, no stress is applied to the optical component 1 and no stress is also applied to the connection portion of the optical component 1 and the optical fibers 3 (3a, 3b). FIG. 3B exaggeratedly shows the expanding amount of the package 2 to easily understand the explanation. The values of $d2_d$ and $d3_d$ are also positive.

Figure 3C:
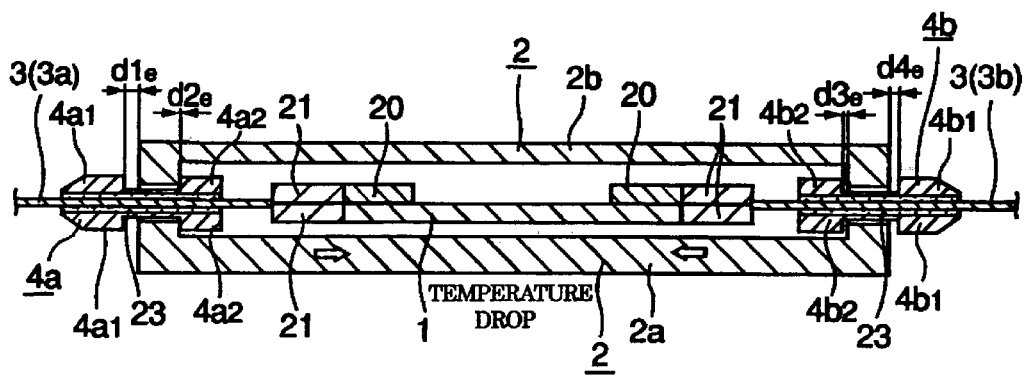

FIG. 3C shows the state of the optical fiber module at −40° C. As temperature is lowered, the package 2 is contracted and the values of intervals d2 and d3 are reduced. However, since $d2_e > 0$ and $d3_e > 0$ are formed, no stress is applied to the optical component 1 and no stress is also applied to the connection portion of the optical component 1 and the optical fibers 3 (3a, 3b). FIG. 3C exaggeratedly shows the contracting amount of the package 2 to easily understand the explanation. The values of $d1_e$ and $d4_e$ are also positive.

In this embodiment, the optical fiber anchor members 4 (4a, 4b) and the package 2 can be relatively moved in the optical fiber longitudinal direction. Therefore, for example, when tensile stress is applied from the exterior to the optical fibers 3 (3a, 3b), as shown in FIGS. 2B and 2C, the optical fibers 3 (3a, 3b) and the optical component 1 are relatively moved in the optical fiber longitudinal direction with respect to the package 2 together with the optical fiber anchor members 4 (4a, 4b).

Accordingly, in the optical fiber module of this embodiment, it is possible to restrain that the tensile stress applied to the optical fibers 3 (3a, 3b) is applied to the optical component 1 within the package 2, and the connection portion of the optical component 1 and the optical fibers 3 (3a, 3b). Accordingly, the change in the optical characteristics of the optical component 1 can be restrained.

When a tensile test of the optical fibers 3 (3a, 3b) of the optical fiber module was really made, no insertion loss of the optical component 1 with respect to a tensile force of 6 kg was changed. The resisting property of the tensile stress required in the optical fiber module was 1 kg, and it was a result satisfying a sufficient use with a margin.

In the optical fiber module of this embodiment, when the package 2 is expanded and contracted as the temperature is changed within the range of temperature for use, the package 2 and the optical fiber anchor members 4 (4a, 4b) are relatively moved. The relative movement range able to relatively move the package 2 and the optical fiber anchor members 4 (4a, 4b) is larger than a relative displacement amount due to the thermal expansion and contraction of both the package 2 and the optical fiber anchor members 4 (4a, 4b). Therefore, it is possible to restrain that the stress is applied from the package 2 to the optical component 1 within the package 2 and the connection portion of the optical component 1 and the optical fibers 3 (3a, 3b) by the thermal expansion and contraction of the above package 2.

A temperature cycle test from −40° C. to 85° C. was really made with respect to the optical fiber module of this embodiment, but no change in the insertion loss of the optical component 1 was seen during the test and before and after the test.

Further, in accordance with this embodiment, the interval is formed in each of the X, Y and Z directions between the package 2 and the optical fiber anchor members 4 (4a, 4b). Accordingly, there is no fear that stress is applied to the optical component 1 and the connection portion of the optical component 1 and the optical fibers 3 (3a, 3b) at an assembly time of the optical fiber module. Therefore, manufacture yield can be improved.

Further, in accordance with this embodiment, since it is not necessary to loosen the optical fibers 3 (3a, 3b) stored into the package 2, the fiber length can be correspondingly shortened so that the module size can be reduced.

Further, in accordance with this embodiment, since the optical fiber anchor members 4 (4a, 4b) is formed by baiton (rubber), the optical fiber anchor members 4 (4a, 4b) can also play the role of boots. Therefore, even when the optical fibers 3 (3a, 3b) is transversally bent, an increase in transmission loss due to this transversal bending can be restrained.

The present invention is not limited to the above embodiment, but various embodiment modes can be adopted. For example, in the above embodiment, the optical fibers 3 (3a, 3b) is connected to both end sides of the optical component 1. However, as shown in FIGS. 4A and 4B, the optical fibers 3 (3a, 3b) may be also connected to only one end side of the optical component 1.

Figure 4A:
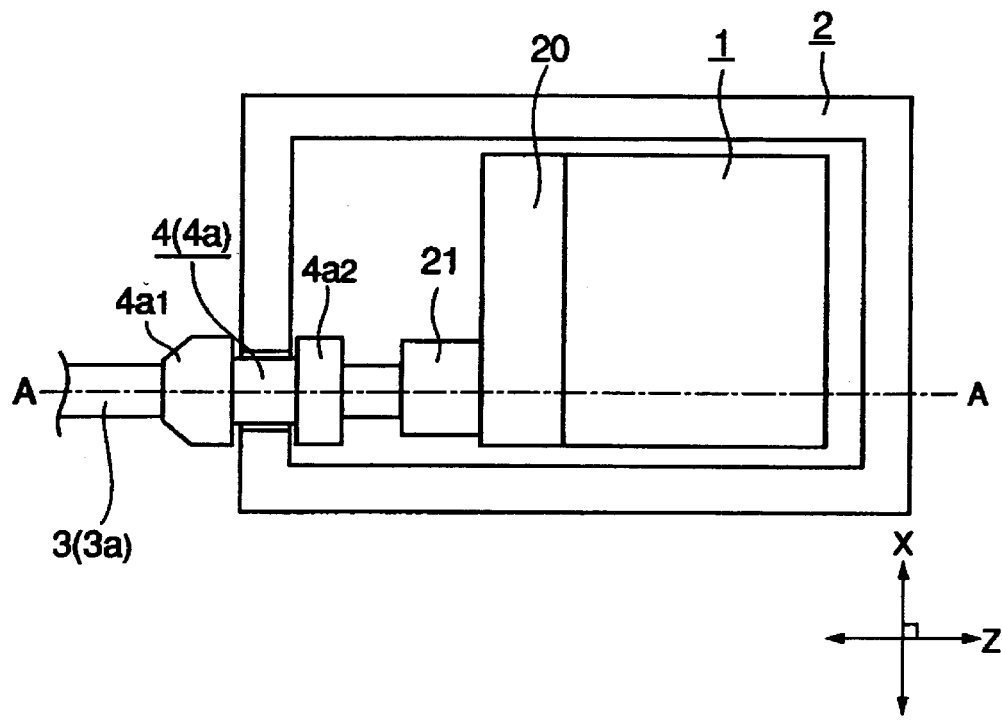
FIGS. 4A and 4B are constructional explanatory views showing another embodiment of the optical fiber module in the present invention.

FIG. 4A is a view in which the interior of the optical fiber module in this embodiment is looked through and seen from its upper portion. FIG. 4B is a cross-section along a chain line A—A of FIG. 4A.

Figure 4B:
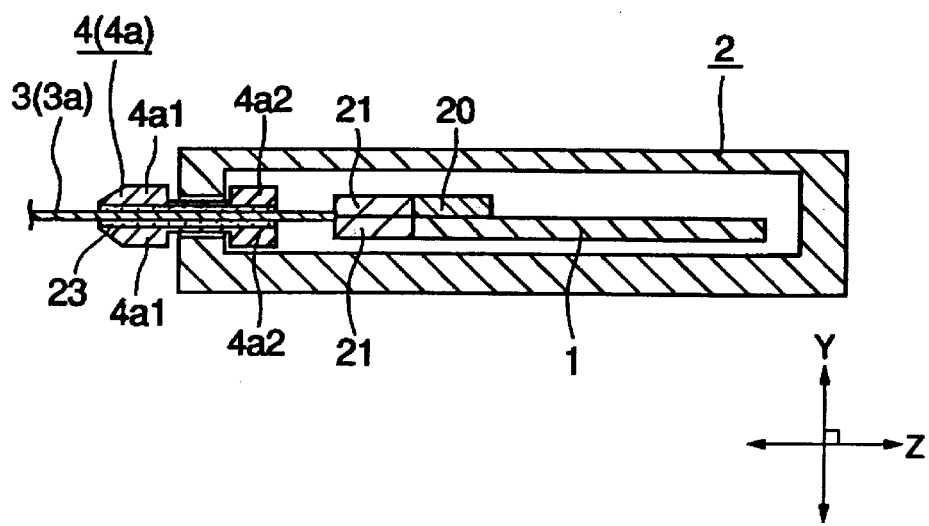

In the example shown in FIGS. 4A and 4B, when tensile stress is applied from the exterior to the optical fibers 3 (3a), the optical fiber anchor members 4 (4a) are engaged with the package 2 and receive its force (stress). Therefore, it is possible to restrain that the stress is applied to the optical component 1 and the connection portion of the optical component 1 and the optical fiber 3 (3a). Accordingly, effects similar to those in the embodiment shown in FIGS. 1A and 1B can be obtained.

Further, in this example shown in FIGS. 4A and 4B, even when the package 2 is thermally expanded and contracted by a temperature change, it is possible to restrain that stress is applied to the optical component 1 and the connection portion of the optical component 1 and the optical fiber 3 (3a) by this thermal expansion and contraction. Accordingly, effects similar to those in the embodiment shown in FIGS. 1A and 1B can be obtained.

Further, in the above embodiment, the optical fiber anchor members 4 (4a, 4b) is formed by baiton, but the material for forming the optical fiber anchor members 4 (4a, 4b) is not particularly limited, but is suitably set.

When the optical fiber anchor members 4 (4a, 4b) are formed by a material not easily elastically deformed, it is possible to set the tensile stress applied to the optical fibers 3 (3a, 3b) such that no tensile stress is easily applied to the connection portion of the optical fibers 3 (3a, 3b) and the optical component 1 and the optical component 1 even when this tensile stress is large.

Further, when the optical fiber anchor members 4 (4a, 4b) are formed by the material having elasticity as in the above embodiment, it is possible to construct the optical fiber anchor members 4 (4a, 4b) such that no optical fiber anchor members 4 (4a, 4b) is easily influenced by bending stress applied to the optical fibers 3 (3a, 3b).

Figure 5:
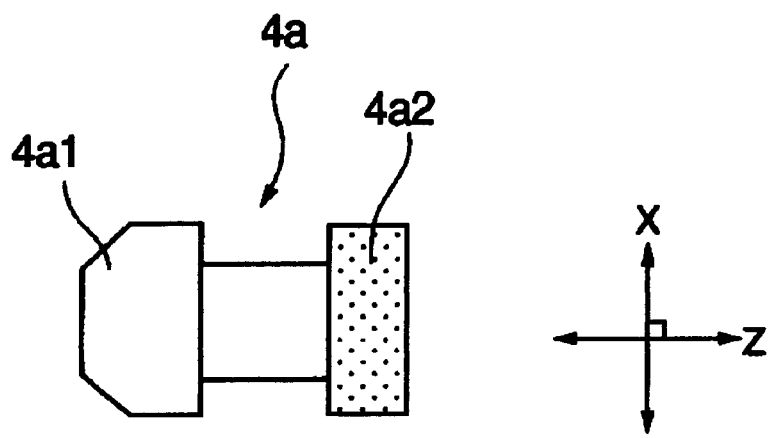
FIG. 5 is an explanatory view showing the optical fiber anchor member in still another embodiment of the optical fiber module in the present invention.

Therefore, in the optical fiber anchor members 4 (4a, 4b), as shown in FIG. 5, it is preferable that the second flange portion 4a2 (or 4b2) arranged within the package 2 is formed by a hard material of low elasticity such as a metal, plastic, and the other parts are formed by a material of high elasticity such as rubber. FIG. 5 shows only the construction of the optical fiber anchor member 4 (4a), but the optical fiber anchor member 4 (4b) can be also set to have a similar construction.

When the optical fiber anchor members 4 (4a, 4b) are constructed as shown in FIG. 5, it is possible to form the optical fiber anchor members 4 (4a, 4b) not more easily influenced by the tensile stress applied to the optical fibers 3 (3a, 3b), and able to play the role of boots.

Figure 6:
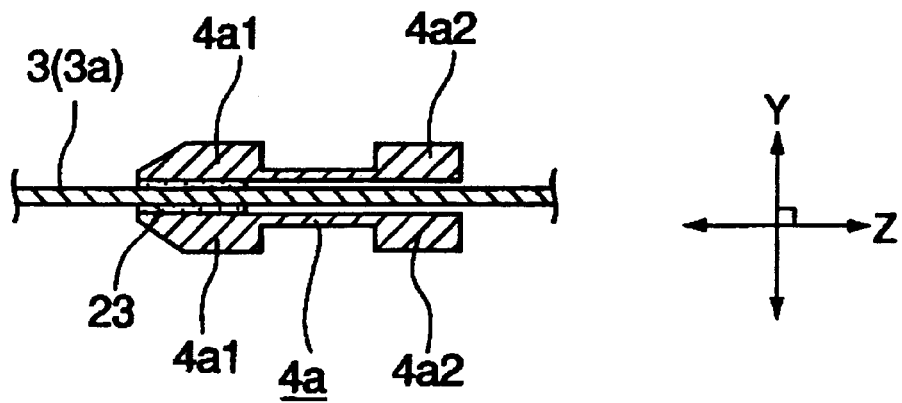
FIG. 6 is an explanatory view showing a fixing structure of the optical fiber anchor member and the optical fiber in further another embodiment of the optical fiber module in the present invention.

Further, in the above embodiment, the optical fibers 3 (3a, 3b) are fixed to the optical fiber anchor members 4 (4a, 4b) by an adhesive 23 arranged in the entire area of the optical fiber anchor members 4 (4a, 4b) in its longitudinal direction. As a substitution example, as shown in FIG. 6, the optical fibers 3 (3a, 3b) may be also fixed by an adhesive 23 arranged in one portion of the optical fiber anchor members 4 (4a, 4b) in its longitudinal direction. FIG. 6 shows only the fixing structure of the optical fiber anchor member 4 (4a) and the optical fiber 3 (3a), but the optical fiber anchor member 4 (4b) can be also set to have a similar construction.

Further, the optical fiber anchor members 4 (4a, 4b) and the optical fibers 3 (3a, 3b) are not necessarily fixed to each other by the adhesive 23, but another fixing construction may be also used if both the optical fiber anchor members 4 (4a, 4b) and the optical fibers 3 (3a, 3b) can be fixed to each other by this fixing construction.

Further, the shape, size, forming method, etc. of the optical fiber anchor members 4 (4a, 4b) are not particularly limited, but are suitably set. For example, the optical fiber anchor members 4 (4a, 4b) of a plastic material may be also molded and formed integrally with the optical fibers 3 (3a, 3b).

Further, as shown in FIGS. 7A and 7B, each optical fiber anchor member 4 (4a, 4b) may be also formed in one flange shape projected onto the outer circumferential side of the optical fibers 3 (3a, 3b). In this case, as shown in FIGS. 7A and 7B, a concave portion 6 is formed in a pulling-out part (an insertion face of the optical fibers 3 (3a, 3b)) of the optical fibers 3 (3a, 3b) of the package 2, and the optical fiber anchor members 4 (4a, 4b) are stored (fitted) into the concave portion 6 through an interval.

In this case, the interval between the face directed to the outside of the first optical fiber anchor member 4 (4a) opposed through a clearance in the longitudinal direction of the optical fiber and a concave portion wall face opposed to this face is set to e1. The interval between the face directed to the inside of the first optical fiber anchor member 4 (4a) and a concave portion wall face opposed to this face is set to e2. The interval between the face directed to the inside of the second optical fiber anchor member 4 (4b) and a concave portion wall face opposed to this face is set to e3. The interval between the face directed to the outside of the second optical fiber anchor member 4 (4b) and a concave portion wall face opposed to this face is set to e4. In this case, effects similar to those in the embodiment shown in the above FIGS. 1A and 1B can be obtained by setting e3>e1 and e2>e4.

In the construction shown in FIGS. 7A and 7B, the optical fibers 3 (3a, 3b) can be set to have the function of boots for resisting its transversal bending by compounding the shape and material of the package 2, etc.

Further, in the above embodiment, the optical fibers 3 (3a, 3b) are set to the optical fiber ribbon, but the optical fiber applied to the optical fiber module of the present invention may be also set to one optical fiber.

Further, in the above embodiment, the optical component 1 is set to the optical component 1 of the optical waveguide circuit having the 1×8 optical waveguide circuit. However, the optical component applied to the optical fiber module of the present invention is not particularly limited, but is suitably set. For example, the optical component may be also set to an optical waveguide circuit having the circuit of an arrayed waveguide grating.

Further, the optical fiber module may be also formed by applying the optical component except for the optical waveguide circuit. As an example of the optical component, there are optical components mainly constructed by an optical fiber as in an optical fiber coupler and an optical fiber grating, an optical component using an optical crystal, a multilayer film filter, etc.

Further, the optical component may not have a structure floated in the package, and may also have a structure held within the package so as to be relatively moved in the optical fiber longitudinal direction with respect to the package.

For example, the optical component can be relatively moved with respect to the package by elastically deforming rubber, a sponge, etc. using a structure for holding the optical component within the package by an elastic body such as rubber, a sponge, etc.

Further, for example, it is also possible to use a holding method having a slide moving mechanism able to relatively move a chip in the optical fiber longitudinal direction with respect to the package.

Figure 12:
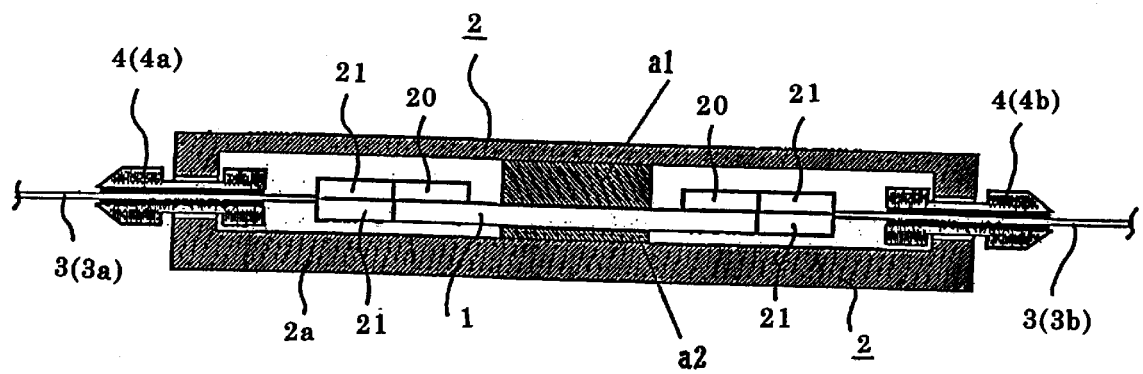
FIG. 12 is a view showing an embodiment of substitution of the optical fiber module having a slide moving mechanism for holding an optical component such that the optical component can be relatively moved in the optical fiber longitudinal direction with respect to a package.

FIG. 12 shows an example of the slide moving mechanism. In FIG. 12, the optical component 1 is held within the package by holding portions a1, a2, but the optical component 1 and the holding portions a1, a2 are not fixed and are set to have sizes having a slight clearance. Further, the surfaces of the holding portions a1, a2 are smooth, and do not prevent the movement of the optical component 1 in the optical fiber longitudinal direction. In FIG. 12, the holding portions a1, a2 are set to components different from the package, but may be also integrated with the package.

Further, a temperature adjusting element such as a heater for temperature control, etc. may be also attached to the optical component.

What is claimed is:

1. An optical fiber module comprising:

a package;

an optical component unfixedly stored into the package; and at least one optical fiber in which one end side of the optical fiber is connected to said optical component and the other end side is inserted into said package in a non-fixing state and is pulled out to the package exterior;

wherein an optical fiber anchor member is arranged in said package in an extraction preventing state in an optical fiber pulling-out area of said package;

the optical fiber anchor member and said optical fiber are fixed; and a relative movement range able to relatively move said optical fiber anchor member and said package in the optical fiber longitudinal direction is given between said optical fiber anchor member and said package.

2. An optical fiber module according to claim 1, wherein the relative movement range is set to be larger than a relative displacement amount due to thermal expansion and contraction of the package and said optical fiber anchor member caused by a temperature change within the range of temperature for use.

3. An optical fiber module according to claim 1, wherein the optical fiber anchor member is engaged with the package and receives tensile force when the tensile stress is applied to the optical fiber and the optical fiber anchor member begins to be moved in the tension direction over the relative movement range; and it is thus restrained that the tensile stress is applied to the optical component, and is also applied to a connection portion of the optical component and the optical fiber.

4. An optical fiber module according to claim 1, wherein a concave portion is formed on a fiber insertion face of the package in the optical fiber pulling-out area, and the optical fiber anchor member fixed to the optical fiber is stored into the space of this concave portion through a play gap, and the interval between one end side face of the optical fiber anchor member opposed through the interval in the longitudinal direction of the optical fiber and a concave portion wall face opposed to this one end side face, and the interval between the other end side face of the optical fiber anchor member and a concave portion wall face opposed to the other end side face form the relative movement range.

5. An optical fiber module according to claim 1, wherein the optical fiber anchor member has first and second flange portions projected in a direction crossing the optical fiber longitudinal direction in positions spaced from each other in the optical fiber longitudinal direction, the wall of the optical fiber pulling-out area of said package is nipped by these first and second flange portions from both sides through intervals, said first flange portion is arranged in the package exterior and said second flange portion is arranged in the package interior, and the interval between the first flange portion of said optical fiber anchor member and the package, and the interval between the second flange portion of the optical fiber anchor member and the package form the relative movement range.

6. An optical fiber module according to claim 1, wherein the optical component and the optical fiber are fixed by an adhesive.

7. An optical fiber module according to claim 1, wherein the optical component has an optical waveguide circuit in which the circuit of an optical waveguide is formed on a substrate.

8. An optical fiber module according to claim 7, wherein the circuit of the optical waveguide has the circuit of an arrayed waveguide grating.

9. An optical fiber module according to claim 1, wherein a temperature adjusting element is attached to the optical component.

10. An optical fiber module according to claim 1, wherein the optical component has a structure held into the package so as to be relatively moved in the optical fiber longitudinal direction with respect to the package.

11. An optical fiber module according to claim 1, wherein the optical component has a structure held into the package by an elastic body so as to be relatively moved in the optical fiber longitudinal direction with respect to the package.

12. An optical fiber module according to claim 11, wherein the elastic body is rubber.

13. An optical fiber module according to claim 1, wherein the optical component has a structure held so as to be relatively moved in the optical fiber longitudinal direction with respect to the package, and this holding structure has a slide moving mechanism.

14. An optical fiber module comprising:

a package;

an optical component unfixedly stored into the package;

at least one first optical fiber in which one end side of the fiber is connected to one end side of said optical component, and the other end side of the fiber is inserted into one end side of said package in a non-fixing state and is pulled out to the package exterior; and at least one second optical fiber in which one end side of this fiber is connected to the other end side of said optical component, and the other end side ofthis fiber is inserted into the other end side of said package in the non-fixing state and is pulled out to the package exterior;

wherein a first optical fiber anchor member is arranged in said package in an extraction preventing state in an optical fiber pulling-out area on one end side of said package;

a second optical fiber anchor member is arranged in said package in the extraction preventing state in the optical fiber pulling-out area on the other end side of said package;

said first optical fiber anchor member and said first optical fiber are fixed, and said second optical fiber anchor member and said second optical fiber are fixed; and a relative movement range able to relatively move said first and second optical fiber anchor members and said package in the optical fiber longitudinal direction is given between said first and second optical fiber anchor members and said package.

15. An optical fiber module according to claim 14, wherein the relative movement range is set to be larger than a relative displacement amount due to thermal expansion and contraction of the package and said optical fiber anchor member caused by a temperature change within the range of temperature for use.

16. An optical fiber module according to claim 14, wherein the first optical fiber anchor member is engaged with the package and receives tensile force when the tensile stress is applied to the first optical fiber and the optical fiber anchor member begins to be moved in the tension direction over the relative movement range;

the second optical fiber anchor member is engaged with the package and receives tensile force when the tensile stress is applied to the second optical fiber and the optical fiber anchor member begins to be moved in the tension direction over the relative movement range; and it is thus restrained that the tensile stress is applied to the optical component, and is also applied to a connection portion of the optical component and the optical fiber.

17. An optical fiber module according to claim 14, wherein a concave portion is formed on a fiber insertion wall face of the package in the optical fiber pulling-out area on one end side and the other end side of the package, the first optical fiber anchor member fixed to the optical fiber is stored into the space of the concave portion on one end side of the package through a play gap, and the second optical fiber anchor member fixed to the optical fiber is stored into the space of the concave portion on the other end side of the package through a play gap, and e3>e1 and e2>e4 are formed when the interval between the face directed to the outside of the first optical fiber anchor member opposed through the interval in the longitudinal direction of the optical fiber and a concave portion wall face opposed to this face is set to e1, and the interval between the face directed to the inside of the first optical fiber anchor member and a concave portion wall face opposed to this face is set to e2, and the interval between the face directed to the inside of the second optical fiber anchor member and a concave portion wall face opposed to this face is set to e3, and the interval between the face directed to the outside of the second optical fiber anchor member and a concave portion wall face opposed to this face is set to e4.

18. An optical fiber module comprising:

a package;

an optical component unfixedly stored into the package;

at least one first optical fiber in which one end side of the fiber is connected to one end side of said optical component, and the other end side of the fiber is inserted into one end side of said package in a non-fixing state and is pulled out to the package exterior; and at least one second optical fiber in which one end side of this fiber is connected to the other end side of said optical component, and the other end side of this fiber is inserted into the other end side of said package in the non-fixing state and is pulled out to the package exterior;

wherein a first optical fiber anchor member is fixedly arranged in the first optical fiber in an extraction preventing state with respect to said package in an optical fiber pulling-out area on one end side of said package;

a second optical fiber anchor member is fixedly arranged in the second optical fiber in the extraction preventing state with respect to said package in the optical fiber pulling-out area on the other end side of said package;

each of said first and second optical fiber anchor members has first and second flange portions projected in a direction crossing the optical fiber longitudinal direction in positions spaced from each other in the optical fiber longitudinal direction;

the wall of the optical fiber pulling-out area of said package is nipped by these first and second flange portions from both sides through intervals;

said first flange portion is arranged in the package exterior and said second flange portion is arranged in the package interior; and d1>d3 and d4>d2 are formed when the interval between the first flange portion of said first optical fiber anchor member and the package is set to d1, and the interval between the second flange portion of the first optical fiber anchor member and the package is set to d2, and the interval between the second flange portion of said second optical fiber anchor member and the package is set to d3, and the interval between the first flange portion of said second optical fiber anchor member and the package is set to d4.

19. An optical fiber module according to claim 18, wherein the second flange portions of the first and second optical fiber anchor members are formed by a material of low elasticity constructed by a metal or plastic, and the remaining parts are formed by a material of elasticity higher than this material.

* * * * *